April 29, 1969     P. T. SCHURMAN ET AL     3,441,071

PLASTIC CONTAINER

Original Filed May 21, 1964

INVENTOR.
Peter T. Schurman and
Raymond C. Confer
BY Christel & Bean
ATTORNEYS.

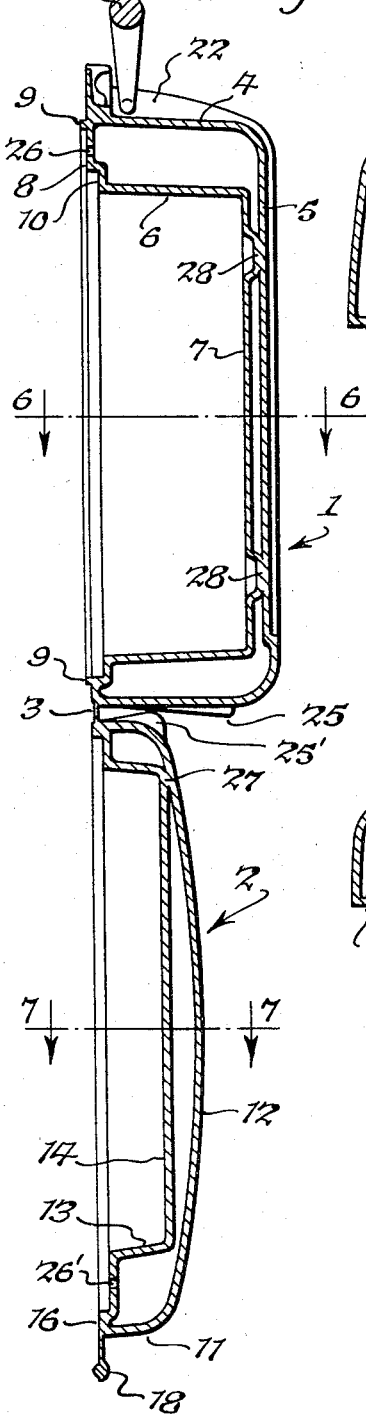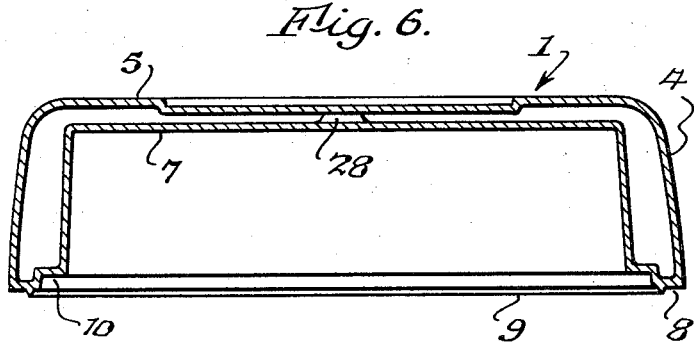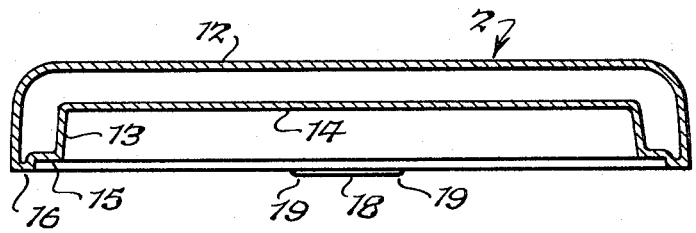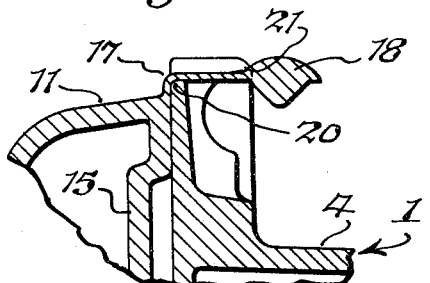

United States Patent Office 3,441,071
Patented Apr. 29, 1969

3,441,071
PLASTIC CONTAINER
Peter T. Schurman, Snyder, and Raymond C. Confer, Gasport, N.Y., assignors, by mesne assignments, to W. R. Grace & Co., New York, N.Y., a corporation of Connecticut
Continuation of application Ser. No. 369,159, May 21, 1964. This application May 27, 1968, Ser. No. 739,974
Int. Cl. B65d 11/16, 11/00, 25/28
U.S. Cl. 150—.5                               5 Claims

ABSTRACT OF THE DISCLOSURE

A unitary container formed from a single tubular parison of thermoplastic material has mating parts joined by a hinge which is unitary with the mating parts. The hinge is formed of two webs of the thermoplastic material compressed together and thinner than the adjacent portions of the mating parts.

---

This application is a continuation of parent application Ser. No. 369,159, filed on May 21, 1964, and now abandoned.

This invention relates generally to the container art, and more specifically to a new and useful molded plastic container and method of making the same.

This invention is primarily concerned with molded plastic containers of one-piece construction, having a body part and a cover part hinged thereto. Heretofore, such containers have been quite flimsy, and the cost structure thereof has not been favorable as compared to containers using steel or other non-plastic material, with the result that such containers have not achieved their full potential.

A primary object of our invention is to provide an economical molded plastic container of one-piece construction having hinged body and cover parts, which container is substantially stronger and more rigid than prior art constructions of this general type.

Another object of our invention is to provide a molded one-piece plastic container having hinged body and cover parts, which container incorporates a double wall construction in at least one of its parts.

Still another object of our invention is to provide a molded one-piece plastic container having hinged body and cover parts, at least one of which has a double wall construction, and a method of making the same, wherein either wall can be changed independently of the other.

In one aspect thereof, a container constructed in accordance with our invention is characterized by the provision of mating parts joined by a hinge integral with both parts, the parts and hinge being of thermoplastic material, and at least one of the parts being of hollow, double wall construction.

In another aspect thereof, a container constructed in accordance with our invention is characterized by the provision of mating parts joined by a hinge integral therewith, at least one of the parts being blow molded and the hinge being compression molded, the parts and hinge being of thermoplastic material.

In still another aspect thereof, a container of our invention is characterized by the provision of mating parts of thermoplastic material hinged together, a fastener tongue integral with one of the parts, the tongue projecting beyond the one part and having laterally projecting ears on opposite sides thereof, the other part having an integral flange projecting therefrom along the tongue beyond the juncture thereof with the one part, the side of the flange opposite the tongue having laterally spaced shoulders undercut for snap-fit engagement with the ears when the tongue is rolled over the flange.

The method of making a container of thermoplastic material having mating parts joined by a hinge, in accordance with our invention, is characterized in one aspect thereof by the step of blow molding the parts and simultaneously compression molding the hinge.

The foregoing and other objects, advantages and characterizing features of our invention will become clearly apparent from the ensuing detailed description of an illustrative embodiment thereof, considered in conjunction with the accompanying drawing wherein like reference numerals denote like parts throughout the various views and wherein:

FIG. 5 is a corresponding view thereof, in open position;

FIG. 6 is a sectional view of the body part thereof, taken about on line 6—6 of FIG. 5;

FIG. 7 is a sectional view of the cover part thereof, taken about on line 7—7 of FIG. 5; and FIG. 8 is an enlarged, fragmentary sectional view through the fastener thereof.

Figure 1:
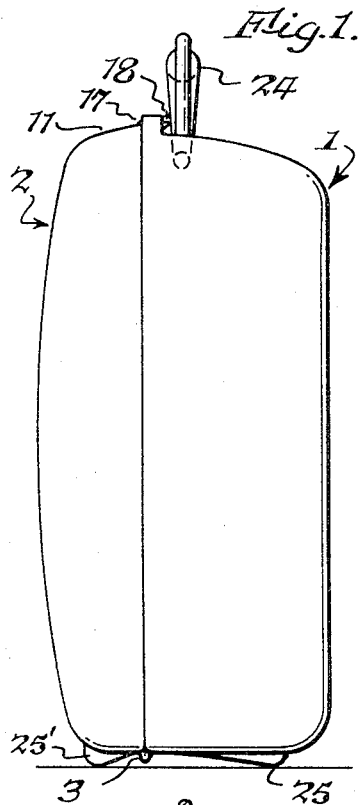
FIG. 1 is a side elevational view of an illustrative container of our invention, in closed position.
Figure 2:
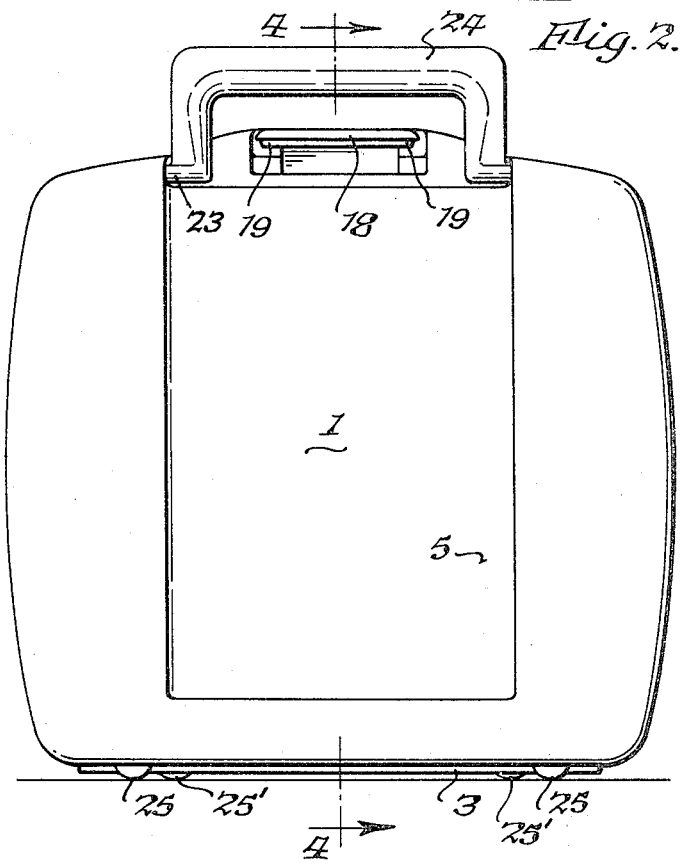
FIG. 2 is a rear elevational view thereof.

Referring now in detail to the illustrative embodiment of our invention depicted in the accompanying drawings, there is shown a container comprising mating parts 1 and 2 joined by a hinge 3 integral therewith. Part 1 comprises a relatively deep body part of hollow, double wall construction formed by an outer shell having opposite end and side walls 4 and a bottom wall 5, and an inner shell having opposite end and side walls 6 and a bottom wall 7. Side and end walls 4 of the outer shell are joined to side and end walls 6 of the inner shell by a peripheral flange in the form of a ledge 8 completely encircling the inner shell. An upstanding rib 9 is formed on ledge 8, for a purpose to be described.

In like manner, part 2 comprises a relatively shallow top cover part of hollow, double wall construction having an outer shell formed by end and side walls 11 and a bottom wall 12, and an inner shell formed by end and side walls 13 and a bottom wall 14. The inner and outer side and end walls 13, 11 are joined by a peripheral flange in the form of an inwardly offset ledge 15 encircled by a skirt 16 and completely encircling the inner shell.

Of course, parts 1 and 2 also can be of the same size, and part 2 can be larger or deeper than part 1, if desired.

It is a particular feature of our invention that body and cover parts 1 and 2 are molded, integral with hinge 3, in one piece, and in a manner imparting great flex endurance to hinge 3 while providing the hollow, double wall construction of parts 1 and 2. This is accomplished, in accordance with our invention, by blow molding parts 1 and 2 and compression molding hinge 3 in one operation. To this end, the container is molded with the parts positioned as shown in FIG. 5, the handle being added later.

The molten plastic material is extruded in tubular form between mating die parts, not shown, which then are brought together to pinch the plastic tube at its upper and lower ends, whereupon air under pressure is introduced into the closed tube to force it outwardly against the die parts, all in a manner well known in the blow molding art. However, whereas the tube of molten plastic normally is pinched closed only at its ends, in accordance with our invention the tube also is pinched closed between its ends, to define and compression mold the hinge 3.

The mating die parts are arranged so that one die part defines the outer shells 4, 5 and 11, 12 while the other die part defines the inner shells 6, 7 and 13, 14. These portions of the container, together with parts 8, 9, 10, 15 and 16, are formed by blow molding, compressed air being introduced into the container parts 1 and 2 through needle openings 26 and 26', respectively, the location of which is not critical. The coacting die parts, in addition to defining spaced cavities for blow molding the container parts, pinch the plastic tube at the hinge and thereby compression mold hinge 3.

The blow molding apparatus used with our invention is conventional, and therefore not shown, except that the dies are formed to pinch the plastic tube between its ends and thereby compression mold hinge 3, and except that compressed air is injected into two cavities, instead of the usual one. Any thermoplastic material having the requisite flexibility for hinge 3 can be used, high density polyethylene, polypropylene, polyvinyl and elastomeric polyolefin being examples of suitable materials. Because the dies pinch the plastic tube between them to form the hinge the hinge is formed of the two layers of the plastic tube pinched together and can appropriately be described as formed of two webs (the two layers). The pinching of the two plastic webs and their compression molding causes the two webs to be compressed together.

Thus, there is provided, in one operation, a one-piece molded container utilizing blow molding to provide hollow, double wall body and cover parts 1, 2, while also utilizing compression molding to provide a hinge which exhibits extended flex life. This has many advantages. For example, ledge 8 provides a shelf imparting, in conjunction with inner shell 6, 7, substantial rigidity to body 1. In like manner, ledge 15, together with inner shell 13, 14 imparts substantial rigidity to cover 1. For increased rigidity, the corners of the inner shells can be made to contact the outer shell, and can be joined thereto, as indicated at 27 in FIGS. 4 and 5. Also, the inner and outer shells can be welded at selected points as shown at 28 in FIG. 5. In this way the flimsiness characteristic of conventional, single shell molded plastic containers is avoided.

The hollow, double wall construction of the container parts also provides a protective cushion for the contents of the container. The shock resistance of such construction affords a degree of protection not available with conventional single shell construction.

Where buoyancy is desired, as in fishing tackle boxes, either body part 1 or cover 2, or both can be made fluidtight by sealing the needle holes 26, 26'.

Figure 4:
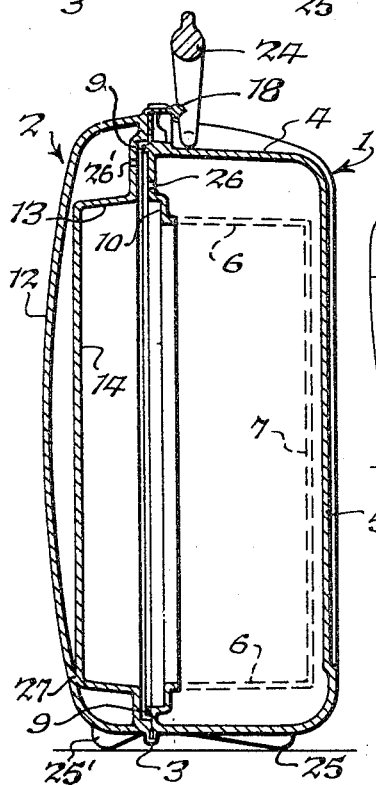
FIG. 4 is a vertical sectional view thereof, taken about on line 4—4 of FIG. 2.
Figure 3:
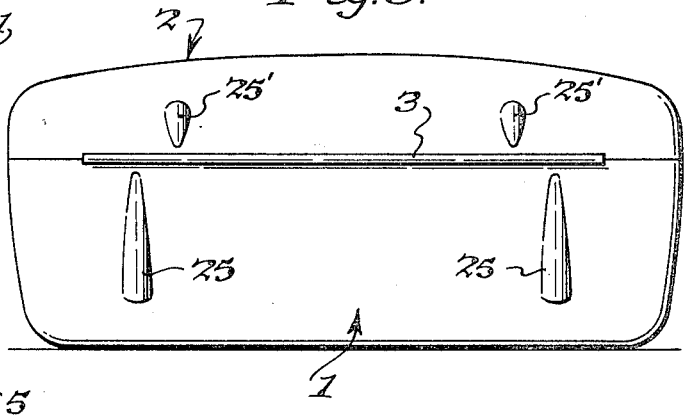
FIG. 3 is an end elevational view thereof.

In addition, with the container and method of our invention the interior of the container can be varied independently of its exterior, and vice versa. This is accomplished by changing the appropriate die part, which can be done because of the blow molding of parts 1 and 2. Indeed, either the interior or the exterior of only one of parts 1 and 2 can be varied, if desired. All of this can be done while still providing the compression molded hinge 3.

Where it is desired to provide a separate insert, the inner shell 6, 7 of the body part 1 can be either partially or wholly removed, as indicated by the broken line showing thereof in FIG. 4. This can be done by cutting, preferably through side and end walls 6 in a plane parallel to ledge 8. This hides the cut, and also leaves a portion of wall 6 for added rigidity. In this respect, it will be noted that ledge 8 continues to impart rigidity to the body part, even with the inner shell removed. An inwardly offset shoulder 10 can be provided, to receive and support an insert, not shown.

If desired, the inner shell of cover 2 can be removed, preferably in like manner. Of course, where the inner shell is to be removed, it will not be joined to the outer shell as shown at 27 and 28.

Hinge 3, being compression molded, has a long flex life, and will withstand repeated opening and closing of the container for as long as the container is used. In closed position, skirt 16 of cover part 2 rests against ledge 8, in encircling relation to rib 9 which helps maintain parts 1 and 2 alined when they are closed.

Extending from cover part 2, opposite hinge 3 and in the plane of skirt 16, is a fastener tab or tongue 17 terminating at its outer end in an enlarged head 18 having ears 19 projecting laterally beyond the opposite sides of tongue 17.

Body part 1 has a flange 20 projecting laterally outwardly along tongue 17 to a point between fastener head 18 and the juncture of tongue 17 and side wall 11. Undercut shoulders 21 are formed on the side of flange 20 opposite tongue 17, and project beyond flange 20 in alinement with ears 19.

When container parts 1 and 2 are brought together, to the closed position shown in FIG. 4, the fastener tongue 17 is rolled over the cam surface of flange 20, and ears 19 snap over and beneath undercut shoulders 21, to releasably hold the container closed. Fastener tongue 17, with its head 18 and ears 19, is compression molded in the same manner and at the same time as hinge 3, and thereby has a long flex life. The flex life of tongue 17 is extended, by the provision of flange 20 which causes the tongue to flex along a line spaced from its juncture with wall 11, instead of at that juncture.

The outer shell of body 1 may be recessed, at its end opposite hinge 3, as indicated at 22, the opposite side walls of the recess being apertured to receive pintles 23 projecting laterally from the opposite ends of a bail type handle 24. The opposite end of the outer body shell may be molded to provide a pair of tapered feet 25, the outer extremities of which are spaced from wall 4 a distance slightly greater than the projection of hinge 3 from walls 11 and 4 when the container is closed. Similar feet 25', or a single foot, may be molded into the outer cover shell. These feet support the closed container in an upright position and prevent the weight of the container and its contents from resting on the hinge.

Flange 20 and undercut shoulders 21 are compression molded in body part 1, and recess 22 and feet 25 and 25' are blow molded therein, at the time body part 1 is formed.

Accordingly, it is seen that our invention fully accomplishes its intended objects. While we have disclosed and described in detail only one embodiment thereof, that has been done by way of illustration only, without thought of limitation.

Having fully disclosed and completely described our invention, together with its mode of operation, what we claims as new is:

1. In a container, the combination of: a body part; a cover part; and a hinge continuous with said body part and said cover part and connecting said parts for opening and closing thereof, said body part, cover part and hinge being formed from a single plastic tubular member, said hinge comprising a pressed laminate formed from opposite sides of said tubular member, said laminate being thinner than the adjacent wall areas of said body part and said cover part from the pressing thereof and at least one of said parts being of hollow double wall construction.

2. The container of claim 1 wherein both of said parts are of hollow double wall construction.

3. The container of claim 1 wherein said part of hollow double wall construction is fluidtight.

4. The container of claim 1 wherein said one part has an inner shell and an outer shell, each shell having a bottom wall, side and end walls in spaced apart relation, the shells being joined by an interconnecting top wall substantially parallel to said bottom wall, said top wall extending to the very outermost edge extension at the periphery of said part.

5. A container formed from a single tubular parison of thermoplastic material and having mating parts joined by a hinge unitary with both of said parts, both of said mating parts being of hollow double wall form with an inner shell and an outer shell, each shell having a bottom wall, side and end walls in spaced apart relation, the shells being unitary and merging at their outermost extending edges and at least one interconnecting juncture merging said inner shell with said outer shell intermediate said edges to structurally stabilize said shells; said hinge comprised of two webs of said thermoplastic material compressed together and thinner than the adjacent portions of said mating parts.

References Cited

FOREIGN PATENTS 654,579  6/1963  Italy.

DONALD F. NORTON, *Primary Examiner.*

U.S. Cl. X.R.

220—9, 31; 206—4

Disclaimer 3,441,071.—*Peter T. Schurman*, Snyder, and *Raymond C. Confer*, Gasport, N.Y. PLASTIC CONTAINER. Patent dated Apr. 29, 1969. Disclaimer filed June 14, 1972, by the assignee, *W. R. Grace & Co.*

Hereby disclaims all that portion of the term of the patent subsequent to May 9, 1984.

[*Official Gazette September 12, 1972*]